United States Patent
Komurasaki et al.

(10) Patent No.: US 9,621,089 B2
(45) Date of Patent: Apr. 11, 2017

(54) CONTROL APPARATUS OF AN AC GENERATOR FOR A VEHICLE

(75) Inventors: Keiichi Komurasaki, Chiyoda-ku (JP); Katsuyuki Sumimoto, Chiyoda-ku (JP); Jyunya Sasaki, Chiyoda-ku (JP); Kazunori Tanaka, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 47 days.

(21) Appl. No.: 13/572,881

(22) Filed: Aug. 13, 2012

(65) Prior Publication Data
US 2013/0271093 A1 Oct. 17, 2013

(30) Foreign Application Priority Data
Apr. 11, 2012 (JP) ................. 2012-089948

(51) Int. Cl.
*H02P 9/10* (2006.01)
*H02P 9/14* (2006.01)
(Continued)

(52) U.S. Cl.
CPC .............. *H02P 9/30* (2013.01); *B60L 3/0061* (2013.01); *B60L 3/04* (2013.01); *B60L 7/14* (2013.01); *B60L 11/14* (2013.01); *H02P 9/48* (2013.01); *B60L 2210/30* (2013.01); *B60L 2210/40* (2013.01); *B60L 2240/421* (2013.01); *B60L 2240/425* (2013.01); *B60L 2250/26* (2013.01);
(Continued)

(58) Field of Classification Search
CPC .............................. H02P 9/48; H02P 2009/002
USPC ...................................... 322/59, 28
See application file for complete search history.

(56) References Cited

U.S. PATENT DOCUMENTS 4,543,521 A * 9/1985 Morishita .......... G01R 31/3648
320/123
4,689,545 A * 8/1987 Komurasaki ............. H02J 7/16
320/123
(Continued)

FOREIGN PATENT DOCUMENTS

JP         3102981 B2    10/2000
JP     2009-112109 A      5/2009
(Continued)

OTHER PUBLICATIONS

Japanese Office Action (Preliminary Notice of Reasons for Rejection), Sep. 3, 2013, Patent Application No. 2012-089948.

*Primary Examiner* — Pedro J Cuevas
(74) *Attorney, Agent, or Firm* — Sughrue Mion, PLLC; Richard C. Turner

(57) ABSTRACT

A control apparatus of an AC generator for a vehicle can obtain large regeneration energy without making the size of the generator large. In the control apparatus in which an AC output current is rectified and supplied to a vehicle mounted battery (6) and an electric load of the vehicle, provision is made for a regulator (5) that controls a continuity rate of electric power supply to a field coil (3) of a generator (1) by controlling an output voltage of the generator (1). The regulator (5) suppresses the continuity rate of electric power supply to the field coil (3) at the time of steady operation of the vehicle, and switches a suppression value of the continuity rate of electric power supply so as to increase the continuity rate of electric power supply at the time of deceleration operation of the vehicle.

6 Claims, 6 Drawing Sheets

(51) Int. Cl.
    *H02P 9/30*           (2006.01)
    *H02P 9/48*           (2006.01)
    *B60L 3/00*           (2006.01)
    *B60L 3/04*           (2006.01)
    *B60L 7/14*           (2006.01)
    *B60L 11/14*          (2006.01)
    *H02P 11/00*         (2006.01)
    *H02P 101/45*        (2016.01)

(52) U.S. Cl.
    CPC ......... *H02P 2101/45* (2015.01); *Y02T 10/642* (2013.01); *Y02T 10/70* (2013.01); *Y02T 10/7077* (2013.01); *Y02T 10/7241* (2013.01)

(56) References Cited

U.S. PATENT DOCUMENTS

| | | | | |
|---|---|---|---|---|
| 5,144,220 | A * | 9/1992 | Iwatani | H02J 7/1446 322/28 |
| 5,157,321 | A * | 10/1992 | Kato | H02J 7/245 320/148 |
| 5,497,071 | A * | 3/1996 | Iwatani | H02J 7/1446 322/28 |
| 5,581,172 | A | 12/1996 | Iwatani et al. | |
| 5,672,954 | A * | 9/1997 | Watanabe | H02J 7/1438 322/22 |
| 5,686,819 | A * | 11/1997 | Iwatani | H02J 7/1438 322/25 |
| 5,719,486 | A * | 2/1998 | Taniguchi | H02J 7/1438 322/24 |
| 5,886,500 | A * | 3/1999 | Iwatani | H02J 7/245 320/104 |
| 6,005,372 | A * | 12/1999 | Kouwa | H02J 7/245 320/104 |
| 6,204,643 | B1 * | 3/2001 | Kouwa | H02P 9/305 322/25 |
| 6,271,649 | B1 * | 8/2001 | Iwatani | H02J 7/245 322/25 |
| 6,275,398 | B1 * | 8/2001 | Sumimoto | H02J 7/244 307/10.1 |
| 6,420,855 | B2 * | 7/2002 | Taniguchi | H02J 7/244 322/28 |
| 6,462,517 | B2 * | 10/2002 | Asada | H02J 7/16 320/123 |
| 6,466,024 | B1 * | 10/2002 | Rogers | 324/427 |
| 6,534,959 | B1 * | 3/2003 | Anderson | H02J 7/166 322/27 |
| 6,696,773 | B2 * | 2/2004 | Taniguchi | H02P 9/08 307/153 |
| 6,756,770 | B2 * | 6/2004 | Watanabe | H02P 9/305 322/25 |
| 7,034,508 | B1 * | 4/2006 | Sasaki | H02P 9/48 322/14 |
| 7,075,272 | B2 * | 7/2006 | Sasaki | H02J 7/245 322/27 |
| 7,078,881 | B2 * | 7/2006 | Aoyama | H02P 9/305 322/27 |
| 7,102,332 | B1 * | 9/2006 | Sasaki | H02J 7/245 322/24 |
| 7,106,029 | B2 * | 9/2006 | Inokuchi | H02P 9/006 322/24 |
| 7,224,148 | B2 * | 5/2007 | Watanabe | H02P 9/305 322/28 |
| 7,315,149 | B2 * | 1/2008 | Kizawa | H02P 9/48 322/19 |
| 8,138,730 | B2 * | 3/2012 | Tsuzuki | H02P 9/305 322/18 |
| 8,797,002 | B2 * | 8/2014 | Komurasaki | H02P 9/305 322/24 |
| 2001/0052761 | A1 * | 12/2001 | Taniguchi | H02J 7/244 322/28 |
| 2003/0001435 | A1 * | 1/2003 | Taniguchi | H02P 9/08 307/43 |
| 2003/0062877 | A1 * | 4/2003 | Watanabe | H02P 9/02 322/28 |
| 2005/0046395 | A1 * | 3/2005 | Aoyama | H02P 9/305 322/27 |
| 2005/0231174 | A1 * | 10/2005 | Iwatani | H02P 9/305 322/25 |
| 2008/0191482 | A1 * | 8/2008 | Okuno | 290/7 |
| 2010/0194355 | A1 * | 8/2010 | Wada et al. | 322/22 |
| 2012/0001598 | A1 * | 1/2012 | Horihata et al. | 322/21 |
| 2012/0007568 | A1 * | 1/2012 | Horihata et al. | 322/21 |
| 2012/0013310 | A1 * | 1/2012 | Clark et al. | 323/204 |
| 2013/0335039 | A1 * | 12/2013 | Komurasaki | H02P 9/48 322/28 |

FOREIGN PATENT DOCUMENTS

| | | |
|---|---|---|
| JP | 2010-081741 A | 4/2010 |
| JP | 2010-178551 A | 8/2010 |

* cited by examiner

CONTROL APPARATUS OF AN AC GENERATOR FOR A VEHICLE

BACKGROUND OF THE INVENTION

Field of the Invention

The present invention relates to a control apparatus of an AC generator for a vehicle (hereinafter also referred to simply as a "generator") which serves to accumulate or store regeneration energy of the vehicle in a vehicle mounted battery as generated output or electric power.

Description of the Related Art

In the past, there has been proposed a control apparatus of an AC generator for a vehicle which changes a control voltage (a target value of an output voltage of the generator) by means of external control (for example, see a first patent document as listed below).

In the conventional apparatus described in the above-mentioned first patent document, it becomes possible to expect a rise in an output current of the generator corresponding to a rise in the control voltage.

PRIOR ART REFERENCES

Patent Documents

First Patent Document: Japanese patent No. 3,102,981

SUMMARY OF THE INVENTION

The conventional control apparatus of an AC generator for a vehicle can change the control voltage by means of external control, and an amount of rise in the output current of the generator can be expected corresponding to an amount of rise in the control voltage, but the amount of rise in the control voltage is limited to within the rated range of the generator, and hence there has been a problem that it is necessary to make the size of the generator larger in order to obtain a much higher output voltage.

The present invention has been made in order to solve the above-mentioned problem, and an object of the present invention is to obtain a control apparatus of an AC generator for a vehicle which is capable of obtaining still larger regeneration energy, without making the size of the generator large.

A control apparatus of an AC generator for a vehicle according to the present invention, in which an AC output current is rectified and supplied to a vehicle mounted battery and an electric load of the vehicle, is provided with a regulator that controls an output voltage of the generator by controlling a continuity rate of electric power supply to a field coil of the generator, wherein the regulator suppresses the continuity rate of electric power supply to the field coil at the time of steady operation of the vehicle, and switches a suppression value of the continuity rate of electric power supply so as to increase the continuity rate of electric power supply at the time of deceleration operation of the vehicle.

According to the present invention, by constructing the control apparatus in such a manner that an overpower electric current can be obtained by a short-time rated operation of the generator, it is possible to obtain still larger regeneration energy, without increasing the size of the generator.

BRIEF DESCRIPTION OF THE DRAWINGS

FIG. 5 is a circuit block diagram showing a control apparatus of an AC generator for a vehicle according to a third embodiment of the present invention.

BEST MODES FOR CARRYING OUT THE INVENTION

First Embodiment

Figure 1:
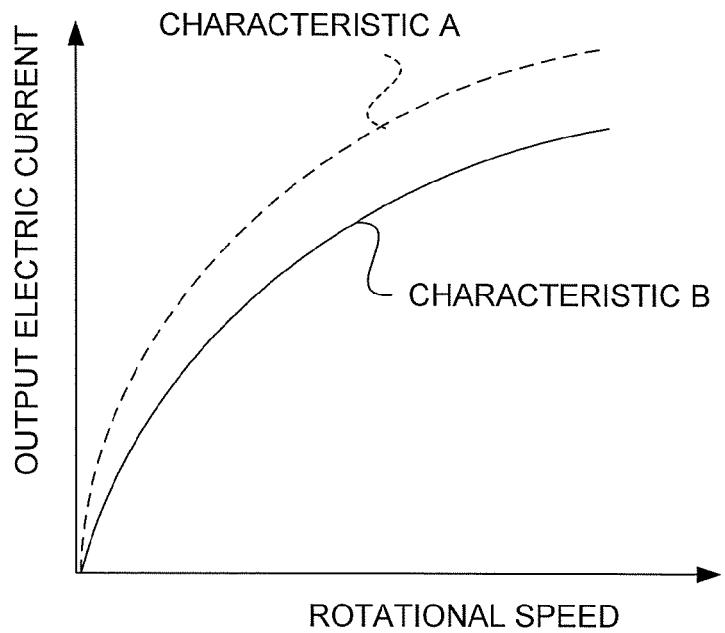
FIG. 1 is an explanatory view showing an output electric current characteristic of a generator to which a first embodiment of the present invention is to be applied.

FIG. 1 is an explanatory view schematically showing one example of an output electric current characteristic of a generator to which a first embodiment of the present invention is to be applied. In addition, FIG. 2 is an explanatory view schematically showing one example of an output electric current characteristic of the generator in cases where the first embodiment of the present invention has been applied to the generator.

Figure 2:
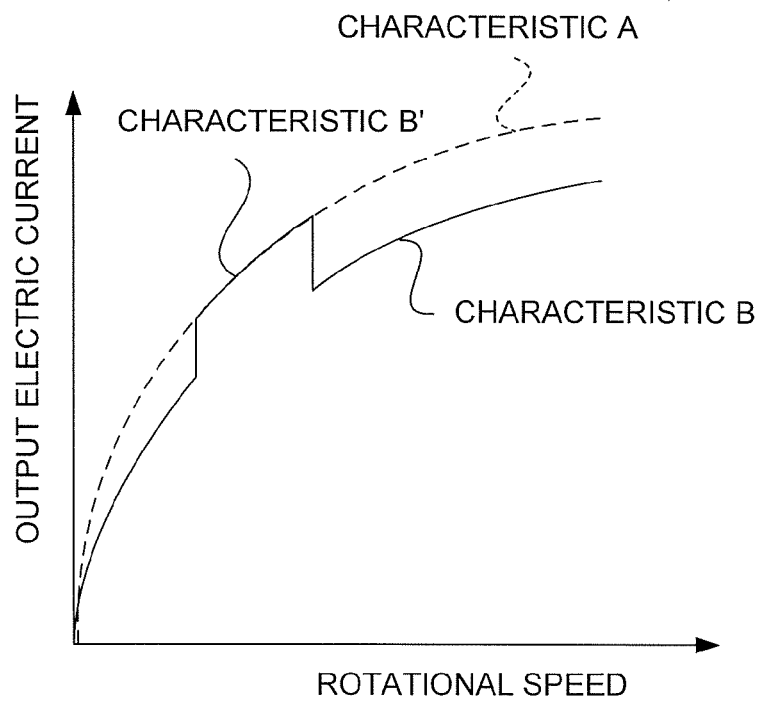
FIG. 2 is an explanatory view showing an output electric current characteristic of the generator in cases where the first embodiment of the present invention has been applied to the generator.

In FIG. 1 and FIG. 2, the axis of abscissa represents the rotational speed of the generator, and the axis of ordinate represents the output current of the generator, wherein a characteristic A indicated by a broken line shows the output current characteristic of the generator at the time of a short-time rated operation thereof when a field coil of the generator is overexcited (an electrical energization of 100%).

In FIG. 1, a characteristic B indicated by a solid line is the output current characteristic of the generator at the time of a continuous rated operation thereof, and shows a case where the continuity rate of electric power supply to the field coil of the generator is suppressed to an electrical energization of 80%, for example.

On the other hand, in FIG. 2, a characteristic B' indicated by a solid line is the output current characteristic of the generator at the time of the execution of regenerative control, and in this case, a control characteristic of the generator is composed of a compound characteristic of the characteristic B' at the time of the short-time rated operation (corresponding to the characteristic A indicated by the broken line), and the characteristic B at the time of the continuous rated operation. Here, note that the period of time in which the short-time rated operation is carried out is decided in accordance with a temperature rise of the generator or a control circuit (a regulator to be described later), and in cases where the temperature rise indicates an overheated state, the short-time rated operation is stopped.

According to the characteristic indicated by the solid line in FIG. 2, at the time of ordinary power generation, the continuity rate of electric power supply to the field coil is suppressed according to the continuous rated operation characteristic (the characteristic B), whereas in a rotation region in which regeneration power generation is required (at the time of deceleration), the suppression of the continuity rate of electric power supply is cancelled according to the characteristic at the time of the short-time rated operation (the characteristic B'), so that the characteristic A (100% electrical energization) is carried out.

Figure 3:
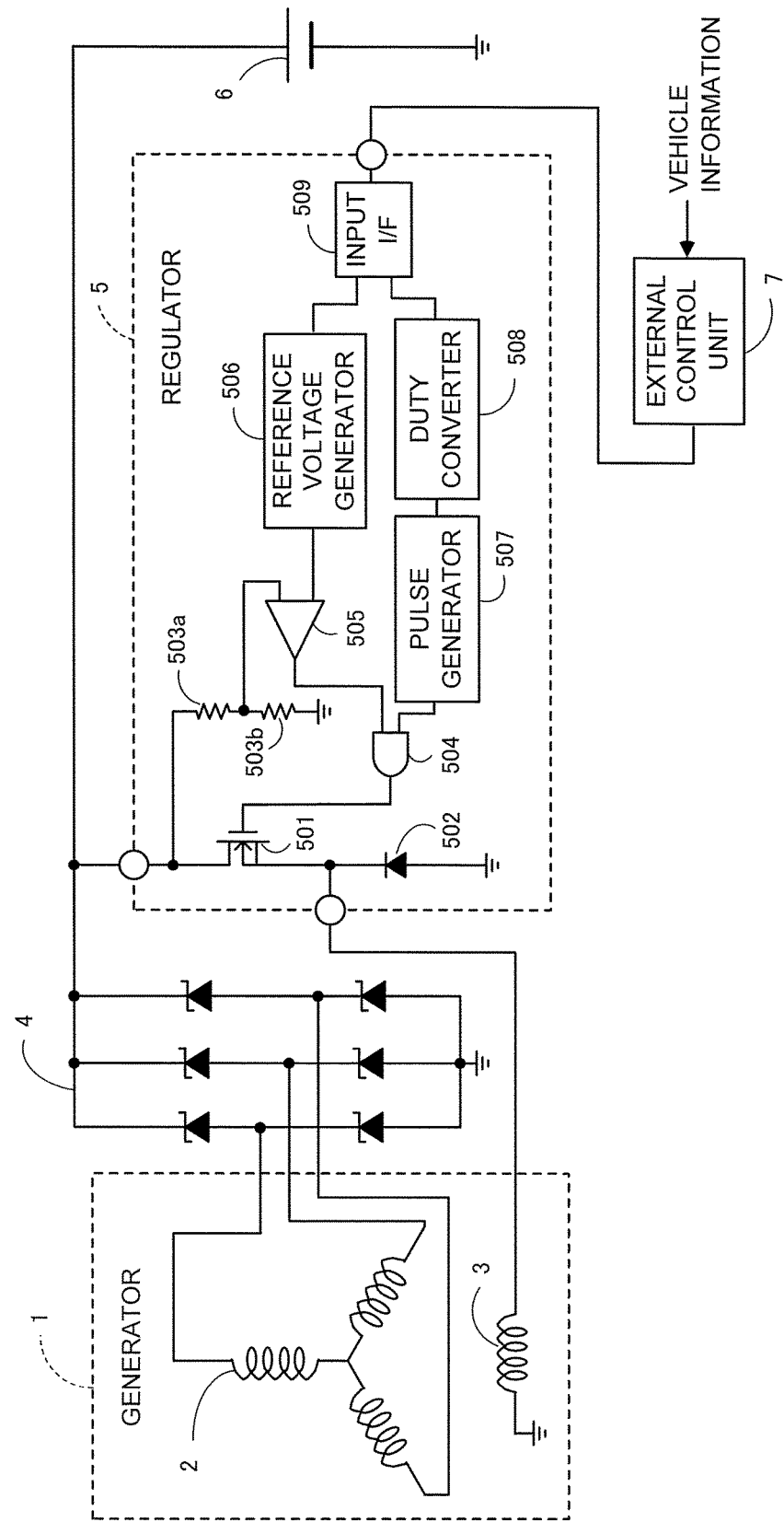
FIG. 3 is a circuit block diagram showing a control apparatus of an AC generator for a vehicle according to the first embodiment of the present invention.

FIG. 3 is a circuit block diagram showing a control apparatus of an AC generator for a vehicle according to the first embodiment of the present invention.

In FIG. 3, the control apparatus of an AC generator for a vehicle according to the first embodiment of the present invention is provided with a generator 1, a regulator 5 (an IC circuit) connected to a rectifier 4 and a vehicle mounted battery 6 (usually, a lead storage battery), and an external control unit 7 connected to the regulator 5. Here, note that in a mounting structure, the regulator 5 constitutes a power generator unit, together with the generator 1 and the rectifier 4.

The generator 1 is mounted on an engine (not shown) of the vehicle, and generates electricity by obtaining a driving force from the engine by means of belting. The generator 1 is provided with a stator coil 2 for generating an AC output current, and a field coil 3 for generating a magnetic flux required for power generation.

The rectifier 4 is composed of a three-phase full wave rectifying construction for converting the AC output current of the stator coil 2 into a direct current.

The regulator 5 functions as a controller to control a power generation output of the generator 1, and serves to control the continuity rate of electric power supply to the field coil 3 in accordance with the voltage values of the rectifier 4 and the vehicle mounted battery 6.

In order to control the power generation state of the generator 1 according to vehicle information (i.e., an engine state, a vehicle traveling condition, the degree of opening of an accelerator, the depression of a brake, etc.), the external control unit 7 determines whether the vehicle information indicates a regenerative mode at the time of vehicle deceleration operation, and gives an instruction or command for switching a control voltage to the regulator 5, and an instruction or command for switching the continuity rate of electric power supply to the field coil 3.

The regulator 5 is provided with a power transistor 501 that drives the field coil 3, a diode 502 that is connected in parallel to the field coil 3 and serves to absorb a surge generated at the time of cutting off the field coil 3, a pair of voltage detecting resistances 503a, 503b that are connected to a DC output line of the rectifier 4, a driver 504 that drives the power transistor 501, a voltage comparator 505 that is connected to one of a pair of input terminals of the driver 504, a reference voltage generator 506 that generates a reference voltage corresponding to a target value for voltage control and supplies it to the voltage comparator 505, a pulse generator 507 that is connected to the other input terminal of the driver 504, a duty converter 508 that is connected to the pulse generator 507, and an input interface 509 that is connected to the reference voltage generator 506 and the duty converter 508.

The voltage detecting resistances 503a, 503b apply a detected voltage (a voltage-divided voltage) of the DC output line of the rectifier 4 to the one input terminal of the voltage comparator 505.

The voltage comparator 505 makes a comparison between the detected voltage from the voltage detecting resistances 503a, 503b and the reference voltage from the reference voltage generator 506, and outputs a voltage of a high (Hi) level when the detected voltage is lower than the reference voltage which becomes a control target value.

The driver 504 drives the power transistor 501 on only in cases where the output voltage of the voltage comparator 505 and the output voltage of the pulse generator 507 indicate high (Hi) levels, respectively. In other words, in cases where the detected voltage of the voltage detecting resistances 503a, 503b is lower than the reference voltage, the driver 504 is going to make the power transistor 501 conductive, thereby causing the continuity rate of electric power supply to the field coil 3 to increase.

The reference voltage generator 506 generates, as the reference voltage for voltage control, a voltage which can be controlled in a linear manner within a range of 12V-15V, for example. Here, note that a control value of the reference voltage is commanded by means of the external control unit 7.

The pulse generator 507 converts the output signal of the duty converter 508 into a high/low (Hi/Lo) signal.

The duty converter 508 converts a command from the external control unit 7 into a continuity rate of electric power supply to the field coil 3.

In the first embodiment of the present invention, specifically, based on a command from the external control unit 7, the duty converter 508 switches over the continuity rate of electric power supply to the field coil 3 between the 100% electrical energization at the time of the short-time rated operation, and suppressed electrical energization of a continuous rating (e.g., the 80% electrical energization).

Upon receipt of a command signal from the external control unit 7, the input interface 509 classifies it into a voltage control signal and a duty control signal, and inputs these signals to the reference voltage generator 506 and the duty converter 508, respectively.

Next, reference will be made to an operation of the control apparatus according to the first embodiment of the present invention, as shown in FIG. 3, while referring to FIG. 1 and FIG. 2.

First, at the time of normal or ordinary operation, the control voltage is rather low (e.g., equal to or less than 13 V), and the field coil 3 is operated at the continuous rated duty (80%), as shown by the solid line characteristic in FIG. 1, so that it supplies electric power to the vehicle mounted battery 6 and an electric load (not shown) of the vehicle.

On the other hand, when the vehicle comes to be in a deceleration state, it becomes a regenerative mode operation, wherein the control voltage is raised to a high voltage (e.g., 14 V or higher), so that a charging current supplied from the generator 1 to the vehicle mounted battery 6 through the rectifier 4 is made to increase. Moreover, the electrical energization duty of the field coil 3 is raised to 100% at the time of the short-time rated operation, as shown by the solid line characteristic in FIG. 2 (i.e., the broken line characteristic in FIG. 1), whereby the output voltage of the generator 1 is made to increase, so that the more regenerative power is stored in the vehicle mounted battery 6.

As described above, the control apparatus for an AC generator for a vehicle according to the first embodiment (FIG. 2 and FIG. 3) of the present invention, in which an AC output current is rectified and supplied to the vehicle mounted battery 6 and an electric load of the vehicle, is provided with the regulator 5 that controls the continuity rate of electric power supply to the field coil 3 of the generator 1 by controlling the output voltage of the generator 1.

The regulator 5 suppresses the continuity rate of electric power supply to the field coil 3 at the time of steady operation of the vehicle, and switches a suppression value of the continuity rate of electric power supply so as to increase the continuity rate of electric power supply at the time of deceleration operation of the vehicle (i.e., at the time of a regenerative mode).

Specifically, the regulator 5 is provided with the power transistor 501 that drives the field coil 3, a voltage detecting part (i.e., the voltage detecting resistances 503a, 503b, the voltage comparator 505, the reference voltage generator 506) that detects the output voltage of the generator 1, the driver 504 that drives the power transistor 501 in cases where the output voltage of the generator is lower than the reference voltage for control, and a duty conversion part (i.e., the pulse generator 507, the duty converter 508) that controls the continuity rate of electric power supply to the field coil by turning the driver 504 on and off, wherein at the time of the regenerative mode, the duty conversion part changes or switches the continuity rate of electric power supply to the field coil 3 from 80% to 100%.

As a result of this, in the control apparatus of an AC generator for a vehicle in which the regeneration energy of the vehicle is accumulated or stored in the vehicle mounted battery 6 as the generated output of the generator 1, it is possible to construct in such a manner that an overpower electric current can be obtained by the short-time rated operation of the generator 1 in addition to the change of the control voltage, and hence, still larger regeneration energy can be obtained without making the size of the generator 1 large.

In addition, the control apparatus of an AC generator for a vehicle according to the first embodiment of the present invention is provided with the external control unit 7 that takes in the operating state of the vehicle as vehicle information, and generates a command to the regulator 5 in accordance with the vehicle information.

In this case, the regulator 5 is provided with the input interface 509 that serves to input the command from the external control unit 7 to the duty conversion part (the duty converter 508), wherein the duty conversion part carries out the changing or switching of a suppression value for the continuity rate of electric power supply to the field coil 3 in accordance with the command from the external control unit 7.

In this manner, in the external control unit 7 which is able to detect the vehicle information, the regeneration energy can be stored in the vehicle mounted battery 6 in a highly efficient manner by generating a regeneration signal so as to give a command to the regulator 5.

Second Embodiment

Figure 4:
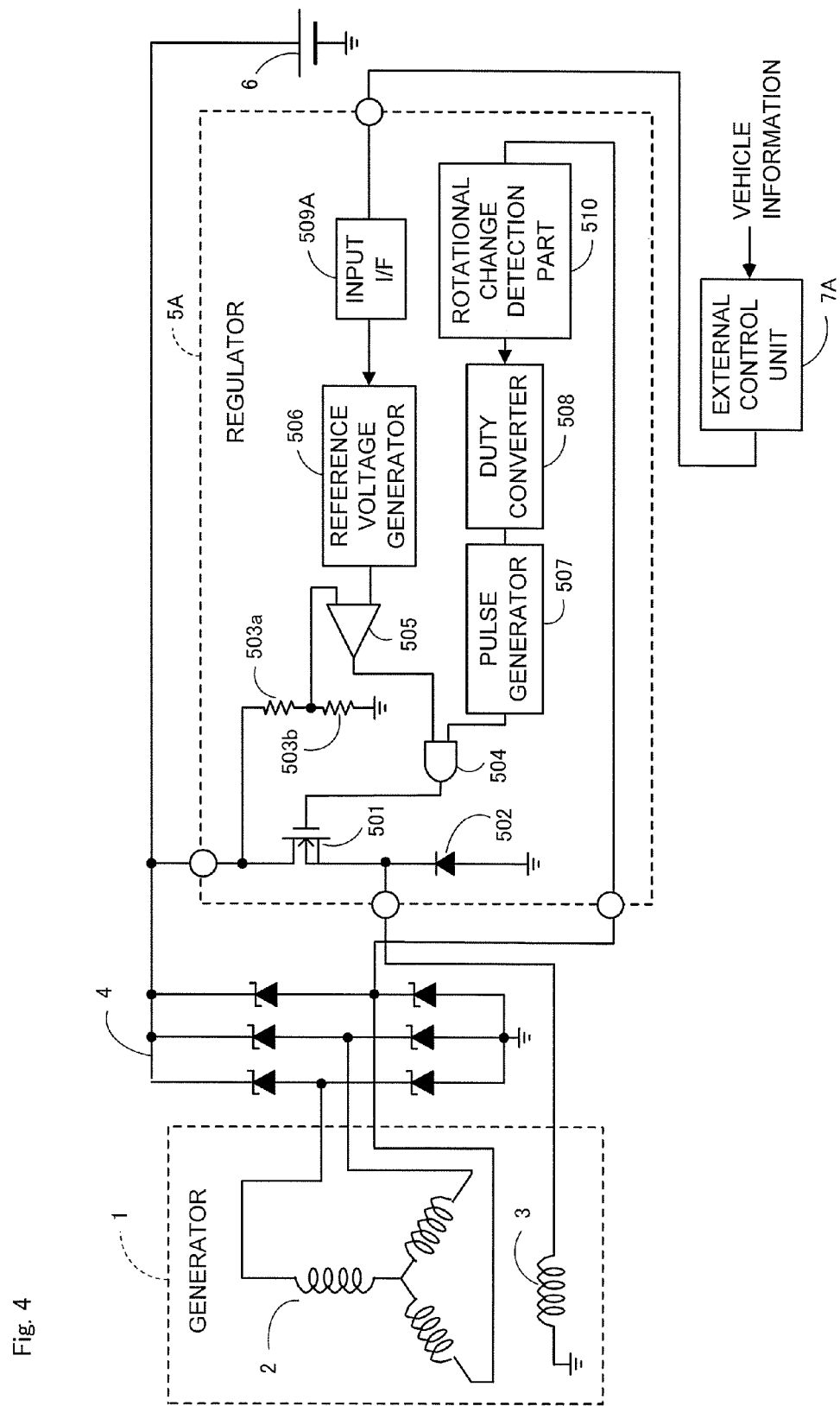
FIG. 4 is a circuit block diagram showing a control apparatus of an AC generator for a vehicle according to a second embodiment of the present invention.

Here, note that in the above-mentioned first embodiment (FIG. 3), provision has been made for the external control unit 7 that generates not only a control voltage command for switching the control voltage, but also a continuity rate switching command for switching the continuity rate of electric power supply to the field coil 3 and supplies them to the regulator 5, but instead, as shown in FIG. 4, for example, a conventional external control unit 7A may be provided which generates only a control voltage command, and a detection signal from a rotational change detection part 510 may be used as the continuity rate switching command to the duty conversion part (the duty converter 508).

FIG. 4 is a circuit block diagram showing a control apparatus of an AC generator for a vehicle according to a second embodiment of the present invention, wherein those components which are similar to the above-mentioned ones (refer to FIG. 3) are denoted by the same reference numerals and characters as those in the above-mentioned embodiment, or with "A" being attached to reference numerals, and a detailed description thereof is omitted.

In FIG. 4, the regulator 5A is provided with the rotational change detection part 510, in addition to the power transistor 501, the diode 502, the voltage detecting resistances 503a, 503b, the driver 504, the voltage comparator 505, the reference voltage generator 506, the pulse generator 507, the duty converter 508, and the input interface 509A, which are the same as those in the above-mentioned embodiment.

In this case, the input interface 509A inputs the output voltage command from the external control unit 7A to the reference voltage generator 506.

The rotational change detection part 510 detects a rotational speed change of the generator 1, and generates a detection result indicative of the fact that the vehicle is in a decelerating operation, in cases where the rotational speed of the generator 1 has decreased by a predetermined value or more.

That is, the rotational change detection part 510 detects a change in the rotational speed of the generator 1 by detecting a half wave waveform of one phase of the stator coil 2, generates a regenerative mode signal as a continuity rate switching command, and inputs it to the duty converter 508 in cases where the rotational speed indicates that the vehicle is in the decelerating operation.

Hereinafter, similarly as stated above, in response to the regenerative mode signal (the continuity rate switching command), the duty converter 508 switches the driving duty of the driver 504 to 100%, and carries out the short-time rated operation of the generator 1.

As described above, according to the second embodiment (FIG. 4) of the present invention, due to the provision of the rotational change detection part 510 which serves to detect the rotational speed change of the generator 1, the duty conversion part (the duty converter 508) of the regulator 5A can change the suppression value for the continuity rate of electric power supply to the field coil 3 in accordance with the rotational speed change of the generator 1.

That is, according to the second embodiment of the present invention, operational effects equivalent to those of the above-mentioned first embodiment can be achieved, and at the same time, a regeneration signal is generated within the regulator 5A in accordance with the rotational speed change of the generator 1, so it becomes possible to perform regenerative control, without the provision of a new external control unit 7 (refer to FIG. 3).

Third Embodiment

Figure 5:
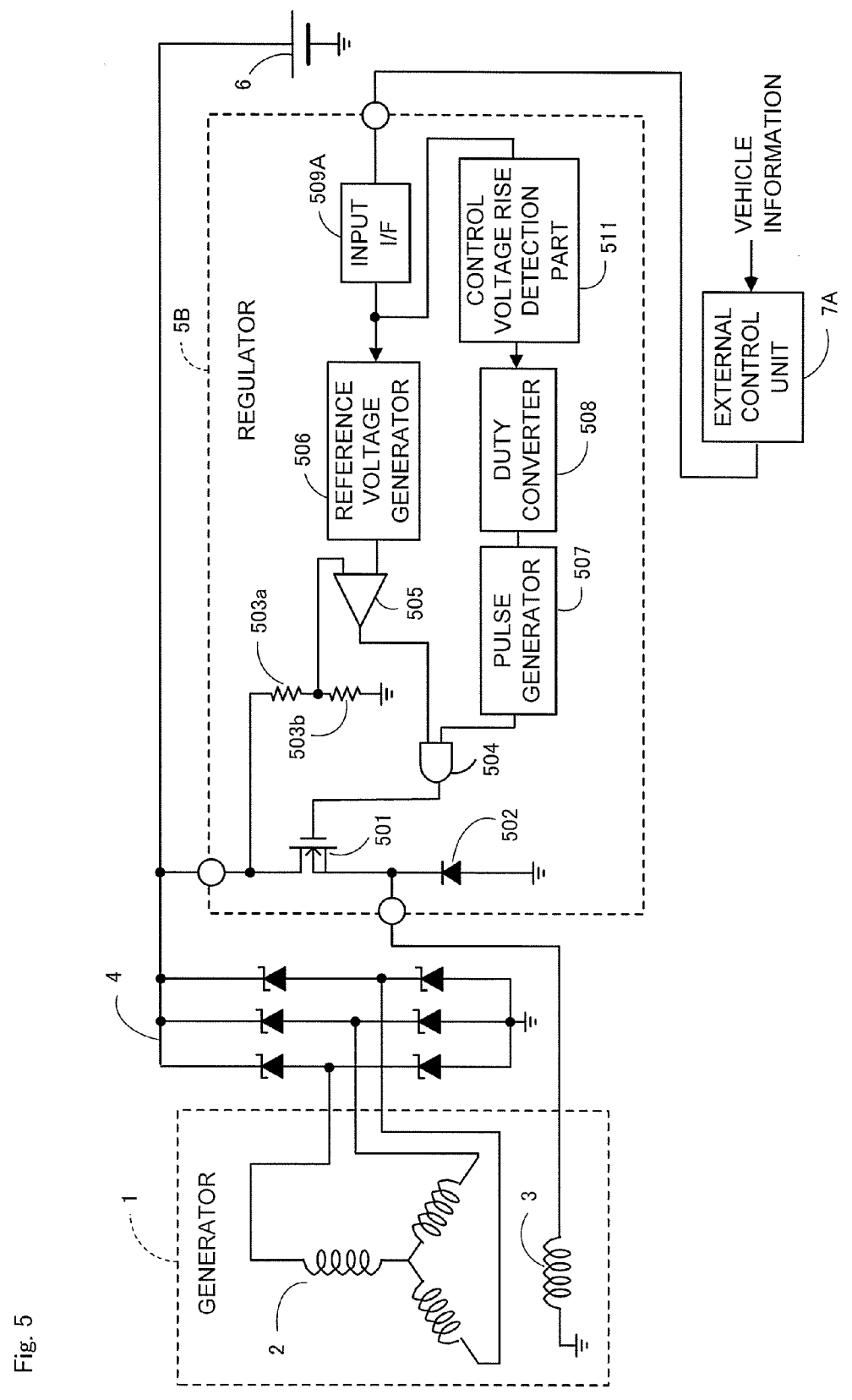

Here, note that in the above-mentioned second embodiment (FIG. 4), the rotational change detection part 510 is used for generating a continuity rate switching command to the duty conversion part (the duty converter 508), but a control voltage rise detection part 511 may be used in place of the rotational change detection part 510, as shown in FIG. 5.

FIG. 5 is a circuit block diagram showing a control apparatus of an AC generator for a vehicle according to a third embodiment of the present invention, wherein those components which are similar to the above-mentioned ones (refer to FIG. 4) are denoted by the same reference numerals and characters as those in the above-mentioned embodiments, or with "B" being attached to reference numerals, and a detailed description thereof is omitted.

In FIG. 5, the regulator 5B is provided with the control voltage rise detection part 511 that is inserted between an output terminal of an input interface 509A and an input terminal of the duty converter 508.

In cases where a command from the external control unit 7A indicates a raise command for the control voltage, the control voltage rise detection part 511 determines that it is in a switch state to a regenerative mode, and inputs a continuity rate switching command to the duty converter 508.

In order to store regenerative electric power in the vehicle mounted battery 6, it is necessary to set the control voltage of the generator 1 to a voltage value which is higher than a terminal voltage of the vehicle mounted battery 6, and hence, due to the provision of the control voltage rise detection part 511, regenerative control can be carried out by the use of a change command for raising the control voltage, as a trigger. In this case, a circuit for newly generating a regeneration signal becomes unnecessary.

Hereinafter, similarly as stated above, in response to a regenerative mode signal (a continuity rate switching command), the duty converter 508 switches the driving duty of the driver 504 to 100%, and carries out the short-time rated operation of the generator 1.

As described above, according to the third embodiment (FIG. 5) of the present invention, due to the provision of the control voltage rise detection part 511 which serves to detect a rise of the control voltage command from the external control unit 7, the duty conversion part (the duty converter 508) can carry out the changing or switching of a suppression value for the continuity rate of electric power supply to the field coil 3 in association with the time when the control voltage command from the external control unit 7A has risen.

That is, according to the third embodiment of the present invention, operational effects equivalent to those of the above-mentioned first embodiment can be achieved, and at the same time, a regeneration signal is generated within the regulator 5B in accordance with the rise of the control voltage command, so it becomes possible to perform regenerative control, without the provision of a new external control unit 7 (refer to FIG. 3).

In addition, the circuit arrangement of the regulator 5B can also be simplified.

Fourth Embodiment

Figure 6:
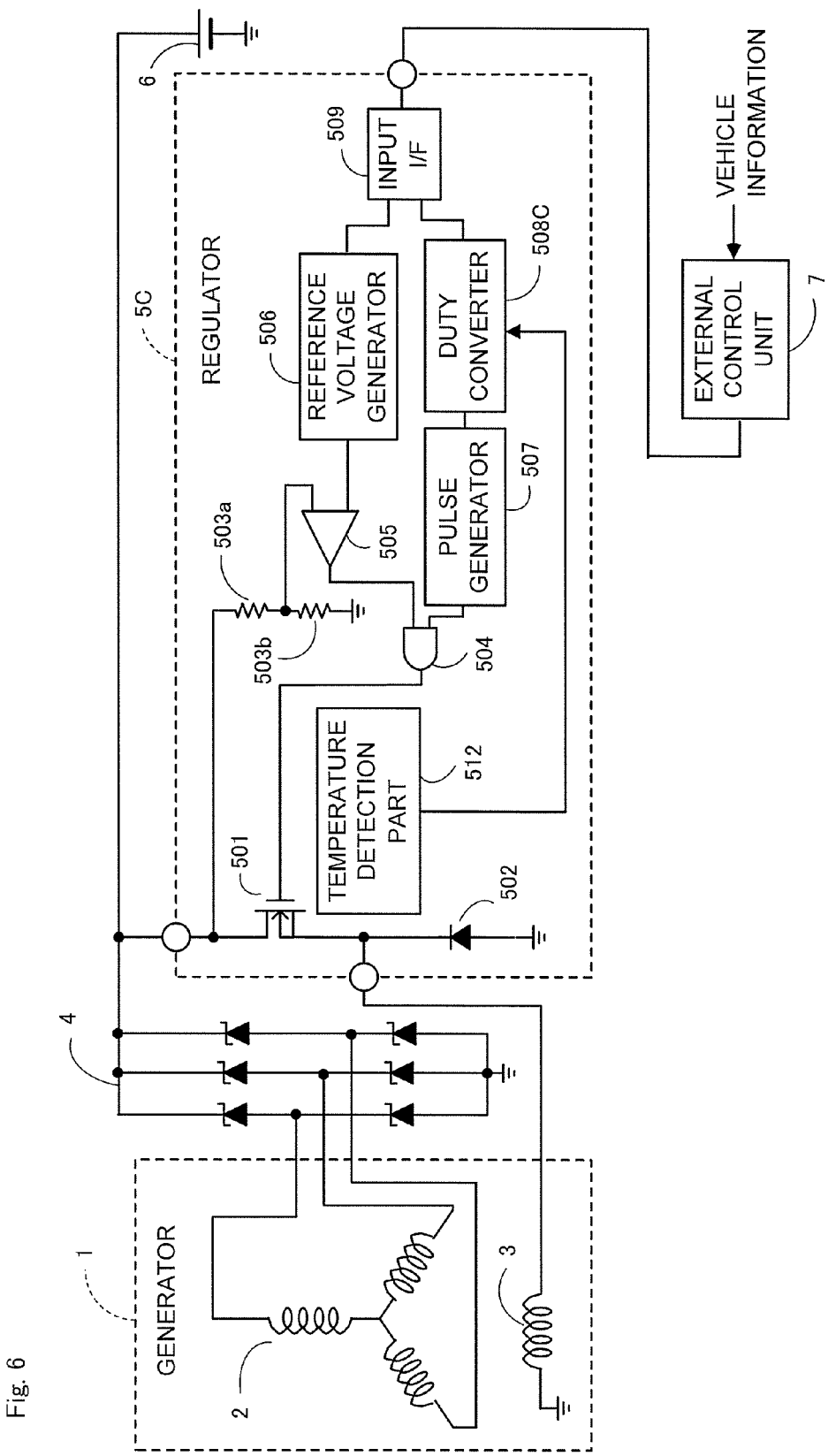
FIG. 6 is a circuit block diagram showing a control apparatus of an AC generator for a vehicle according to a fourth embodiment of the present invention.

Here, note that in the above-mentioned first through third embodiments (FIG. 3-FIG. 5), no particular consideration has been taken into account for a rise in the temperature of the generator 1 or the regulator, but it is desirable that a temperature detection part 512 be provided, as shown in FIG. 6, wherein in cases where an overheated state of the generator 1 or the regulator is detected at the time of the short-time rated operation thereof, the short-time rated operation (regenerative mode) is prohibited, thereby returning the operation of the generator 1 to the normal mode, thus making it possible to achieve an overheat protection function.

FIG. 6 is a circuit block diagram showing a control apparatus of an AC generator for a vehicle according to a fourth embodiment of the present invention, wherein those components which are similar to the above-mentioned ones (refer to FIG. 3) are denoted by the same reference numerals and characters as those in the above-mentioned embodiment, or with "C" being attached to reference numerals, and a detailed description thereof is omitted.

In FIG. 6, a regulator 5C is provided with a temperature detection part 512 that is arranged in the vicinity of a power transistor 501 which is a heat generation portion within an IC, wherein a detection signal of the temperature detection part 512 is inputted to a duty converter 508C.

Here, note that in FIG. 6, an example of application to the construction of the above-mentioned first embodiment (FIG. 3) is shown, but it goes without saying that the invention can also be applied to the other second and third embodiments (FIG. 4 and FIG. 5). In addition, the temperature detection part 512 may be arranged in the vicinity of the field coil 3 which becomes a heat generation portion of the generator 1.

When a temperature rise in the vicinity of the power transistor 501 exceeds a predetermined value at the time of the short-time rated operation (at the time of the regenerative mode), the temperature detection part 512 makes a determination that the regulator 5C has reached an overheated state, and inputs a detected result (a short-time rated operation prohibition command) indicative of the overheated state to the duty converter 508C.

As a result of this, by changing the continuity rate of electric power supply to the field coil 3 from the short-time rated operation (100%) to the continuous rated operation (80%), the duty converter 508C prohibits the short-time rated operation in a forced manner, and carries out overheat protection of the regulator 5C.

As described above, according to the fourth embodiment (FIG. 6) of the present invention, provision is made for the temperature detection part 512 that detects the temperature of the generator 1 or the regulator 5C, and it is constructed in such a manner that when the temperature of the generator 1 or the regulator 5C exceeds the predetermined value, the regulator 5C (the duty converter 508C) prohibits the increasing changing or switching of the continuity rate of electric power supply to the field coil 3, and causes the operation of the generator 1 to return to the normal mode. As a result, it is possible to achieve the overheat protection function at the time of the short-time rated operation for obtaining an overpower electric current.

Fifth Embodiment

Figure 7:
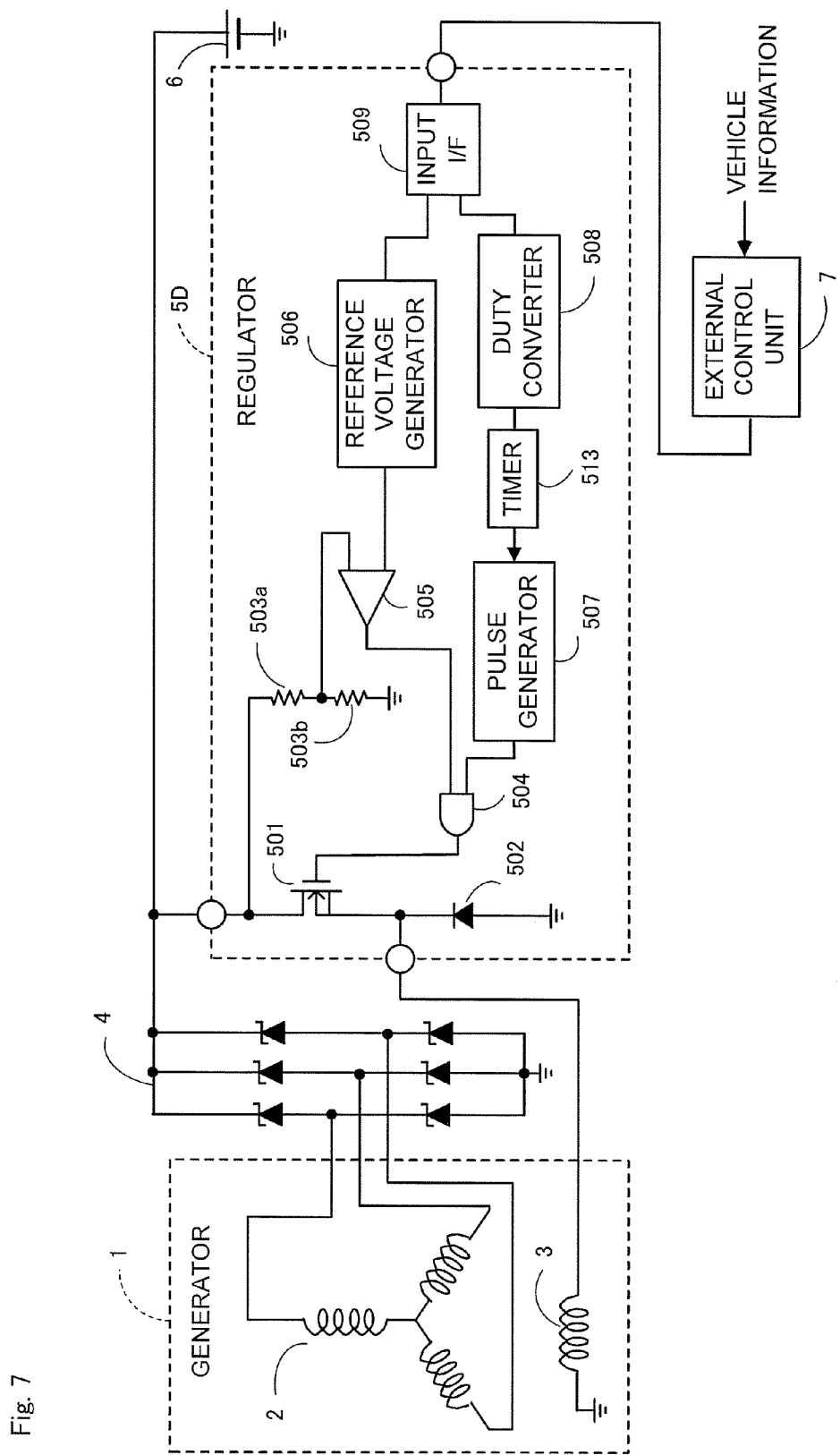
FIG. 7 is a circuit block diagram showing a control apparatus of an AC generator for a vehicle according to a fifth embodiment of the present invention.

Here, note that in the above-mentioned fourth embodiment (FIG. 6), in order to achieve the overheat protection function at the time of the short-time rated operation, the temperature detection part 512 has been provided, but a timer 513 may be provided, as shown in FIG. 7, and in cases where the time of the duration of the short-time rated operation exceeds a predetermined period of time, the short-time rated operation (regenerative mode) of the generator 1 may be prohibited, and the operation thereof may be made to return to the normal mode, thereby making it possible to achieve a fail safe function.

FIG. 7 is a circuit block diagram showing a control apparatus of an AC generator for a vehicle according to a fifth embodiment of the present invention, wherein those components which are similar to the above-mentioned ones (refer to FIG. 3) are denoted by the same reference numerals and characters as those in the above-mentioned embodiment, or with "D" being attached to reference numerals, and a detailed description thereof is omitted.

In FIG. 7, the regulator 5D is provided with the timer 513 that is inserted between the duty converter 508 and the pulse generator 507.

The timer 513 estimates a temperature rise of the regulator 5D due to the short-time rated operation by the use of an elapsed time thereof, and carries out the overheat protection of the regulator 5D based on the temperature rise thus estimated, and at the same time has a fail safe function, too.

The timer 513 measures the elapsed time at the time of the short-time rated operation mode, then prohibits the short-time rated operation in a forced manner and changes or switches it to the ordinary continuous rating operation, in cases where the elapsed time reaches the predetermined period of time (the short-time rated operation has continued for the predetermined period of time).

Here, note that in FIG. 7, an example of application to the construction of the above-mentioned first embodiment (FIG. 3) is shown, but it goes without saying that the invention can also be applied to the other second and third embodiments (FIG. 4 and FIG. 5). In addition, the invention may be applied to the construction of the above-mentioned fourth embodiment (FIG. 6) in a redundant or overlapped manner.

As described above, according to the fifth embodiment (FIG. 7) of the present invention, the timer 513 is provided which serves to measure an elapsed time from a time point at which a switching operation of the continuity rate of electric power supply to the field coil 3 is carried out, and the regulator 5D (the duty converter 508) can switch the continuity rate of electric power supply to the field coil 3 to a value (80%) at the time of steady operation, in cases where a return command to make the continuity rate of electric power supply return to that at the time of steady operation is not generated, even if the elapsed time reaches a fixed period of time.

As a result, operational effects equivalent to those in the above-mentioned first embodiment can be achieved, and at the same time, the field current can be suppressed in a forced manner at the time of failure in the return switching of the continuity rate of electric power supply to the normal operation, thus making it possible to achieve the fail safe function of protecting the field coil 3 and the power transistor 501 (field coil driver element) within the regulator 5D.

What is claimed is:

1. A control apparatus of an AC generator for a vehicle in which an AC output current is rectified and supplied to a vehicle mounted battery and an electric load of the vehicle, said apparatus comprising:
    a regulator that controls a continuity rate of electric power supply to a field coil of the AC generator by controlling an output voltage of the AC generator in accordance with a voltage value of a rectifier and a voltage value of the vehicle mounted battery,
    wherein said regulator comprises a duty conversion part that determines a suppression value which suppresses the continuity rate of electric power supply to said field coil at a time of steady operation of said vehicle,
    wherein said duty conversion part is configured to change the suppression value of said continuity rate of electric power supply in accordance with the rotational speed change of the generator, so as to increase said continuity rate of electric power supply from the value at the steady operation, in a rotation region in which regenerative power generation is required for said vehicle, and
    wherein a regeneration signal is generated within the regulator in real-time in accordance with the rotational speed of the generator so as to perform regenerative control, said regeneration signal being generated without using an external control unit,
    said control apparatus further comprising:
    an external control unit that takes in an operating state of said vehicle as vehicle information, and generates a control voltage command to said regulator in accordance with said vehicle information,
    wherein said regulator includes a control voltage rise detection part that detects a rise of the control voltage command from said external control unit, and determines the suppression value of the continuity rate of electric power supply to said field coil at the time when said control voltage command has risen.

2. The control apparatus of an AC generator for a vehicle as set forth in claim 1, wherein
    said regulator further comprises:
    a power transistor that drives said field coil;
    a voltage detection part that detects the output voltage of said AC generator; and
    a driver that drives said power transistor in cases where the output voltage of said generator is lower than a reference voltage which becomes a control target value; and
    wherein the duty conversion part controls the continuity rate of electric power supply to said field coil by turning said driver on and off, and
    wherein said duty conversion part determines said suppression value of said continuity rate of electric power supply so as to increase said continuity rate of electric power supply at a time of deceleration operation of said vehicle.

3. The control apparatus of an AC generator for a vehicle as set forth in claim 1, further comprising:
    a temperature detection part that detects the temperature of a heat generation portion of said generator or said regulator;
    wherein said regulator prohibits the increasing of the continuity rate of electric power supply to the field coil at the time when the temperature of said generator or said regulator exceeds a predetermined value.

4. The control apparatus of an AC generator for a vehicle as set forth in claim 1, wherein
    said regulator includes a timer that measures an elapsed time from a time point at which a switching operation of the continuity rate of electric power supply to said field coil is carried out; and
    said regulator switches the continuity rate of electric power supply to the field coil to that at the time of steady operation in a forced manner, in cases where a return command to make the continuity rate of electric power supply return to that at the time of steady operation is not generated even when said elapsed time reaches a fixed period of time.

5. A control apparatus of an alternating current (AC) generator comprising:
    a rectifier configured to convert AC output current into direct current;
    a vehicle mounted battery; and
    a regulator configured to control a continuity rate of electric power supply of a field coil of the AC generator by controlling an output voltage of the generator in accordance with a voltage value of the rectifier and a voltage value of a vehicle mounted battery; and
    an external control unit configured to provide a vehicle information data to the regulator,
    wherein the regulator comprises a duty conversion unit configured to determine a suppression value which suppresses the continuity rate of electric power supply to the field coil during steady operation of the vehicle,
    wherein the duty conversion part is configured to change a suppression value of the continuity rate of electric power supply in accordance with a rotational speed change of the generator so as to increase the continuity rate electric power supply from the value at the steady operation, in a rotation region in which regenerative power generation is required for said vehicle,
    wherein a regeneration signal is generated within the regulator in real-time in accordance with the rotational speed of the generator so as to perform regenerative control, said regeneration signal being generated without using the external control unit,
    wherein
    the external control unit takes in an operating state of said vehicle as vehicle information, and generates a control voltage command to said regulator in accordance with said vehicle information, and wherein said regulator includes a control voltage rise detection part that detects a rise of the control voltage command from said external control unit, and determines the suppression value of the continuity rate of electric power supply to said field coil at the time when said control voltage command has risen.

6. A control apparatus of an AC generator for a vehicle in which an AC output current is rectified and supplied to a vehicle mounted battery and an electric load of the vehicle, said apparatus comprising:

a regulator that controls a continuity rate of electric power supply to a field coil of the AC generator by controlling an output voltage of the AC generator in accordance with a voltage value of a rectifier and a voltage value of the vehicle mounted battery, wherein said regulator comprises a duty conversion part that determines a first suppression value according to a continuous rated characteristic which suppresses the continuity rate of electric power supply to said field coil at a time of steady operation of said vehicle, and wherein said duty conversion part is configured to change a second suppression value which cancels the first suppression value and the suppression of said continuity rate of electric power supply in accordance with a rotational speed change of the generator so as to increase said continuity rate of electric power supply from the value at the steady operation to a short-term rated characteristic, in a rotation region in which regenerative power generation is required for said vehicle for power regeneration, and wherein a regeneration signal is generated within the regulator in real-time in accordance with the rotational speed of the generator so as to perform regenerative control, said regeneration signal being generated without using an external control unit, said control apparatus further comprising:

an external control unit that takes in an operating state of said vehicle as vehicle information, and generates a control voltage command to said regulator in accordance with said vehicle information, wherein said regulator includes a control voltage rise detection part that detects a rise of the control voltage command from said external control unit, and determines the suppression value of the continuity rate of electric power supply to said field coil at the time when said control voltage command has risen.

* * * * *